(12) United States Patent
Krishnaswamy et al.

(10) Patent No.: US 10,893,008 B2
(45) Date of Patent: Jan. 12, 2021

(54) SYSTEM AND METHOD FOR GENERATING AND COMMUNICATING COMMUNICATION COMPONENTS OVER A MESSAGING CHANNEL

(71) Applicant: Koopid Inc, San Ramon, CA (US)

(72) Inventors: Venkatesh Krishnaswamy, San Ramon, CA (US); Ajita John, Holmdel, NJ (US); David Skiba, Golden, CO (US); Kundan Singh, San Francisco, CA (US); Shalini Yajnik, Berkeley Heights, NJ (US); Ramanujan Kashi, Bangalore (IN)

(73) Assignee: Koopid, Inc, San Ramon, CA (US)

( * ) Notice: Subject to any disclaimer, the term of this patent is extended or adjusted under 35 U.S.C. 154(b) by 146 days.

(21) Appl. No.: 16/118,384

(22) Filed: Aug. 30, 2018

(65) Prior Publication Data

US 2020/0076750 A1   Mar. 5, 2020

(51) Int. Cl.
*H04L 12/58* (2006.01)
*G06F 9/451* (2018.01)
*H04L 29/08* (2006.01)
*G06F 40/205* (2020.01)
*G06F 3/0488* (2013.01)
*G06F 3/0482* (2013.01)
*G06F 3/0481* (2013.01)

(52) U.S. Cl.
CPC .......... *H04L 51/046* (2013.01); *G06F 3/0482* (2013.01); *G06F 3/0488* (2013.01); *G06F 3/04817* (2013.01); *G06F 3/04883* (2013.01); *G06F 9/451* (2018.02); *G06F 40/205* (2020.01); *H04L 51/04* (2013.01); *H04L 51/066* (2013.01); *H04L 51/12* (2013.01); *H04L 51/24* (2013.01); *H04L 67/34* (2013.01)

(58) Field of Classification Search
CPC .... G06F 9/451; G06F 40/205; G06F 3/04817; G06F 3/0482; G06F 3/0488; G06F 3/04883; H04L 51/046; H04L 51/066; H04L 67/34; H04L 51/04; H04L 51/12; H04L 51/24
See application file for complete search history.

(56) References Cited

U.S. PATENT DOCUMENTS

| 8,631,078 | B2 * | 1/2014 | Wherry | H04L 51/04 709/206 |
|---|---|---|---|---|
| 9,324,067 | B2 * | 4/2016 | Van Os | G06Q 20/10 |
| 9,483,763 | B2 * | 11/2016 | Van Os | G06Q 20/3224 |
| 9,634,967 | B2 * | 4/2017 | Wherry | H04L 51/04 |
| 9,911,123 | B2 * | 3/2018 | Van Os | G06Q 20/40 |
| 10,043,185 | B2 * | 8/2018 | Van Os | G06Q 20/227 |

(Continued)

*Primary Examiner* — George C Neurauter, Jr.

(57) ABSTRACT

A method for generating and communicating communication components over a messaging channel is provided. The method includes (i) presenting a structured micro block based on a conversation in a form of unstructured natural language in the messaging channel between a user and an agent (ii) incorporating the structured micro block that collects strongly typed information from the user as a part of the conversation in the messaging channel, (iv) generating a structured workflow by interleaving the structured micro block with the unstructured natural language, and (v) communicating the structured workflow over the messaging channel for enabling the user to perform one or more operations.

14 Claims, 8 Drawing Sheets

(56) References Cited

U.S. PATENT DOCUMENTS

| | | | |
|---|---|---|---|
| 10,282,727 B2* | 5/2019 | Van Os | G06Q 30/0631 |
| 10,438,205 B2* | 10/2019 | Van Os | H04M 1/72522 |
| 10,476,819 B2* | 11/2019 | Crusson | G06F 9/451 |
| 10,482,461 B2* | 11/2019 | Van Os | G06Q 20/227 |
| 2007/0112714 A1* | 5/2007 | Fairweather | G06K 13/0825 |
| | | | 706/46 |
| 2009/0265355 A1* | 10/2009 | Chen | G06F 16/00 |
| 2012/0110480 A1* | 5/2012 | Kravets | G06F 16/9577 |
| | | | 715/760 |
| 2014/0157106 A1* | 6/2014 | Bertram | G06F 40/14 |
| | | | 715/234 |
| 2014/0250366 A1* | 9/2014 | Bertram | G06F 16/958 |
| | | | 715/234 |
| 2015/0199316 A1* | 7/2015 | Cairns | H04L 67/02 |
| | | | 715/209 |
| 2016/0253665 A1* | 9/2016 | Van Os | H04M 1/72522 |
| | | | 705/44 |
| 2016/0373552 A1* | 12/2016 | Chakra | H04L 67/327 |
| 2017/0300897 A1* | 10/2017 | Ferenczi | G06Q 20/367 |
| 2017/0357972 A1* | 12/2017 | Van Os | G06Q 20/29 |
| 2018/0101297 A1* | 4/2018 | Yang | G06F 3/04883 |
| 2018/0165002 A1* | 6/2018 | Yang | H04M 1/72522 |
| 2018/0300161 A1* | 10/2018 | Landowski | H04L 51/32 |
| 2018/0335928 A1* | 11/2018 | Van Os | G06Q 20/204 |
| 2018/0336543 A1* | 11/2018 | Van Os | G06Q 20/223 |
| 2019/0018586 A1* | 1/2019 | Yang | G06F 3/04847 |
| 2020/0076750 A1* | 3/2020 | Krishnaswamy | H04L 67/34 |

* cited by examiner

SYSTEM AND METHOD FOR GENERATING AND COMMUNICATING COMMUNICATION COMPONENTS OVER A MESSAGING CHANNEL

BACKGROUND

Technical Field

Embodiments of this disclosure generally relate to generating communication components, more particularly, to a system and a method for generating and communicating the communication components over a messaging channel.

Description of the Related Art

A Messaging channel is usually a loosely managed communication medium with unstructured messages flowing between two or more parties in the medium. The lack of structure in the medium prevents certain types of interactions to be easily handled by the medium. As an example, using free form text to provide information for a loan application can cause a lot of inaccuracies in data collection and cause the communication to go back and forth between the parties involved to correct the inaccuracies, thereby resulting in a frustrated customer and making the channel less desirable for such interaction. Some of the existing products available in the market solve the problem by sending users links to online forms or documents or external workflow applications that are used to complete the workflows (e.g. a loan application form on the web). Such an approach moves the workflow out of the messaging channel which prevents the state of the transaction from being preserved in the messaging channel. Some products like Facebook Messenger provide structured widgets. However, they only provide a few predefined types of widgets and a user is forced to fit their use case into one of the predefined types or use free form text. This limits the usability of the channel for a large category of business workflows.

Accordingly, there remains a need for a system and method for generating and communicating communication components over a messaging channel.

SUMMARY

In view of foregoing, an embodiment herein provides a method for generating and communicating communication components over a messaging channel. The method includes (i) presenting a structured micro block using at least one of (a) a pre-existing set of structured micro blocks or (b) one or more structured micro blocks which are selected by a user, (ii) incorporating the structured micro block that collects strongly typed information from the user as a part of a conversation in the messaging channel, (iii) generating a structured workflow by interleaving the structured micro block with unstructured natural language in the messaging channel, and (iv) communicating the structured workflow over the messaging channel for enabling the user to perform one or more operations.

In one embodiment, the method includes step of analyzing the unstructured natural language for extracting entities along with content and an intent to add type information in the unstructured natural language.

In another embodiment, the structured micro block is expressed in a Hypertext Markup Language (HTML) with type information that is stored as pattern attributes in the HTML.

In yet another embodiment, data is provided to the structured micro block through external parameters.

In yet another embodiment, the data is provided into a user interface element of the structured micro block by the user.

In yet another embodiment, the method includes step of (a) sending a Uniform Resource Locator (URL) of the structured micro block, and (b) sending the data corresponding to the structured micro block in a separate message on the messaging channel for presenting a previous state of a conversation history at a later time in the messaging channel.

In yet another embodiment, the method includes step of presenting the previous state of the conversation history at the later time in the messaging channel based on (a) the Uniform Resource Locator (URL) of the structured micro block, and (b) the data corresponding to the structured micro block in the separate message on the messaging channel.

In yet another embodiment, the method further includes step of validating the data entered at the structured micro block based on user specific business logic.

In yet another embodiment, the structured micro block is prefilled with the data when the structured micro block is presented to the user or an agent based on at least one of (a) context of a recent conversation, (b) previous user history, (c) predicted conversation, (d) a specific point in time or (e) point in time relative to a specific time or an event.

In yet another embodiment, the structured micro block includes a title and one or more metadata associated with the structured micro block. The one or more metadata enable the user to recreate a context in which the structured micro block is used.

In yet another embodiment, the structured micro block includes a set of data elements and visual representations of the data elements.

In yet another embodiment, the data is derived from at least one of static data from design time, collected or changed data at runtime and persistent dynamic data changes over time at runtime.

In one aspect, there is provided one or more non-transitory computer readable storage mediums storing one or more sequences of instructions, which when executed by one or more processors, causes a processor implemented method to perform generating and communicating communication components over a messaging channel. The one or more non-transitory computer readable storage mediums includes the steps of: (i) presenting a structured micro block using at least one of (a) a pre-existing set of structured micro blocks or (b) one or more structured micro blocks which are selected by a user; (ii) incorporating the structured micro block that collects strongly typed information from the user as a part of a conversation in the messaging channel, (iii) generating a structured workflow by interleaving the structured micro block with unstructured natural language in the messaging channel, and (iv) communicating the structured workflow over the messaging channel for enabling the user to perform one or more operations.

In one embodiment, the method further includes analysis of the unstructured natural language for extracting entities along with content and an intent to add type information in the unstructured natural language.

In another embodiment, data is provided to the structured micro block through external parameters.

In yet another embodiment, the data is provided into a user interface element of the structured micro block by the user.

In yet another embodiment, the method includes step of (a) sending a Uniform Resource Locator (URL) of the structured micro block, and (b) sending the data corresponding to the structured micro block in a separate message on the messaging channel for presenting a previous state of a conversation history at a later time in the messaging channel.

In yet another embodiment, the method further includes presenting the previous state of the conversation history at the later time in the messaging channel based on (a) the Uniform Resource Locator (URL) of the structured micro block, and (b) the data corresponding to the structured micro block in the separate message on the messaging channel.

In another aspect, a system for generating and communicating communication components over a messaging channel is provided. The system includes a memory that stores a set of instructions and a processor that executes the set of instructions and is configured to (i) present a structured micro block using at least one of (a) a pre-existing set of structured micro blocks or (b) one or more structured micro blocks which are selected by a user, (ii) incorporate the structured micro block that collects strongly typed information from the user as a part of a conversation in the messaging channel, (iii) generate a structured workflow by interleaving the structured micro block with unstructured natural language in the messaging channel, and (iv) communicate the structured workflow over the messaging channel for enabling the user to perform one or more operations.

In one embodiment, the processor is further configured to analyze the unstructured natural language for extracting entities along with content and an intent to add type information in the unstructured natural language.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for generating and communicating communication components over a messaging channel. Referring now to the drawings, and more particularly to FIGS. 1 through 7, where similar reference characters denote corresponding features consistently throughout the figures, there are shown preferred embodiments.

Figure 1:
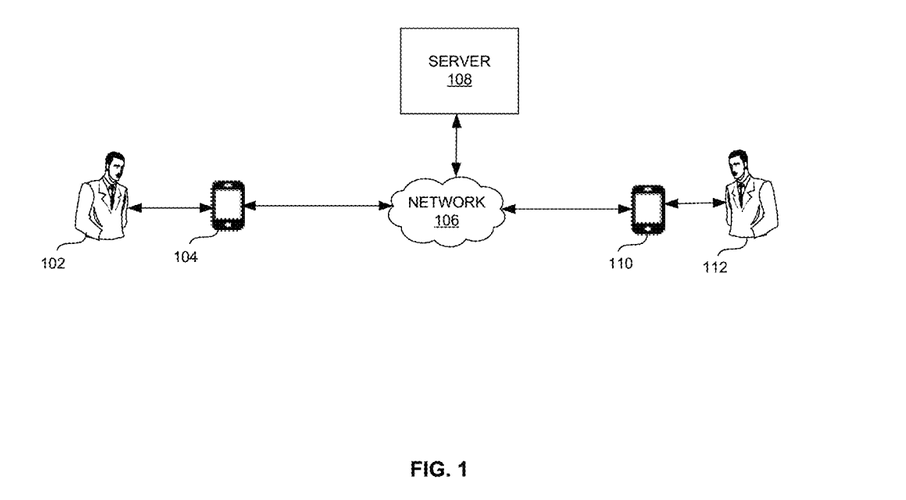
FIG. 1 illustrates a system for generating and communicating communication components over a messaging channel according to an embodiment herein.

FIG. 1 illustrates a system for generating and communicating communication components over a messaging channel according to an embodiment herein. The system includes a user device 104, a network 106, a server 108, and an agent device 110. The user device 104 is accessed by a user 102. The agent device 110 is accessed by an agent 112. The server 108 presents a structured micro block using at least one of (i) a pre-existing set of structured micro blocks or (ii) one or more structured micro blocks which are selected by the user 102. The structured micro block includes a title and one or more metadata associated with the structured micro block. The one or more metadata enable the user 102 to recreate a context in which the structured micro block is used. In one embodiment, the structured micro block includes a set of data elements and visual representations of the set of data elements. The structured micro block is expressed in a Hypertext Markup Language (HTML) with type information that is stored as pattern attributes in the HTML. The server 108 configures a data type that constitutes a strongly typed structured micro block. Data for the structured micro block is derived from at least one of static data from design time, collected or changed data at runtime, and persistent dynamic data changes over time at runtime. The data is provided to the structured micro block through external parameters. The data is provided into a user interface element of the structured micro block by the user 102. The server 108 (a) sends a Uniform Resource Locator (URL) of the structured micro block and (b) sends the data corresponding to the structured micro block in a separate message on the messaging channel to present a previous state of a conversation history at a later time in the messaging channel.

The server 108 presents the previous state of the conversation history at the later time based on (a) the Uniform Resource Locator (URL) of the structured micro block, and (b) the data corresponding to the structured micro block in the separate message on the messaging channel. The server 108 incorporates the structured micro block that collects strongly typed information from the user 102 as a part of a conversation in the messaging channel. The server 108 generates a structured workflow by interleaving the structured micro block with unstructured natural language. The server 108 analyzes the unstructured natural language for extracting entities along with content and an intent to add type information in the unstructured natural language and stores the extracted entities in a form of metadata. In one embodiment, the unstructured natural language is analyzed by at least one of a regular expression, pattern matching, statistical methods, deep learning neural networks, or other machine learning techniques. The server 108 communicates the structured workflow over the messaging channel for enabling the user 102 to perform one or more operations. The structured micro block is communicated to the user device 104 and the agent device 110 through the network 106. In one embodiment, the network 106 is a wired network or a wireless network. In one embodiment, the user device 104 and the agent device 110 may be a mobile phone, a kindle, a PDA (Personal Digital Assistant), a tablet, a music player, a computer, an electronic notebook, or a smartphone.

The server 108 validates the data entered at the structured micro block based on user-specific business logic. The structured micro block is prefilled with the data when the structured micro block is presented to the user 102 or the agent 112 based on at least one of (a) context of a recent conversation, (b) previous user history, (c) predicted conversation, (d) a specific point in time or (e) point in time relative to a specific time or an event.

Figure 2:
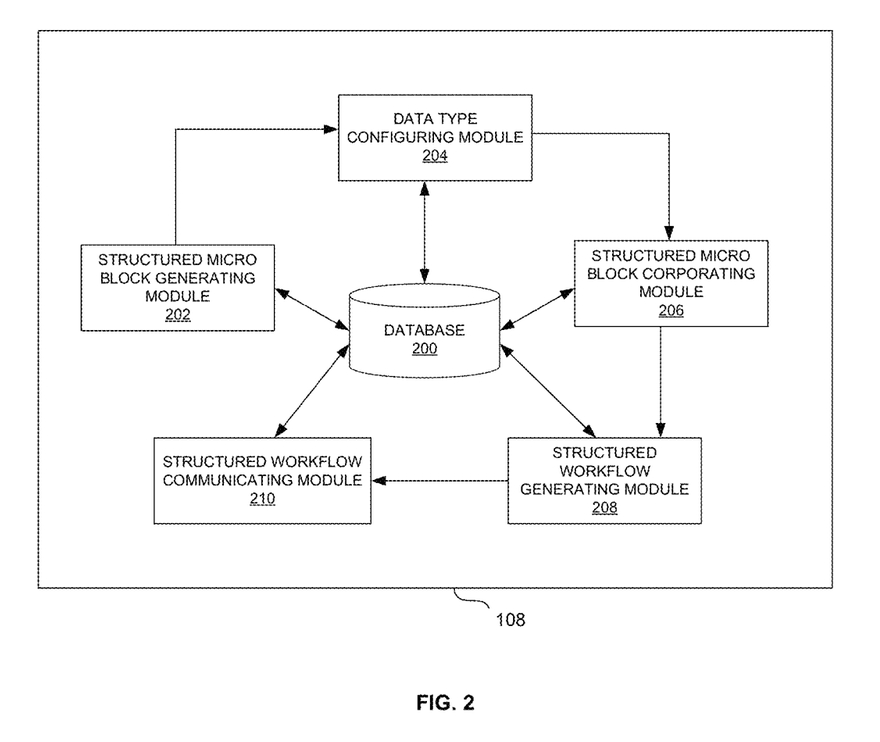
FIG. 2 illustrates an exploded view of a server of FIG. 1 according to an embodiment herein.

FIG. 2 illustrates an exploded view of the server 108 of FIG. 1 according to an embodiment herein. The server 108 includes a database 200, a structured micro block generating module 202, a data type configuring module 204, a structured micro block incorporating module 206, a structured workflow generating module 208, and a structured workflow communicating module 210. The database 200 stores a state of the one or more structured micro blocks and retrieves the state of the one or more structured micro blocks to display or present the state of one or more structured micro blocks to the user 102 at a later time. In some embodiments, the state of the one or more structured micro blocks includes the one or more structured micro blocks along with the data entered into the one or more structured micro blocks. The structured micro block generating module 202 presents the structured micro block using at least one of (i) the pre-existing set of structured micro blocks or (ii) the one or more structured micro blocks which are selected by the user 102. The structured micro block is generated using one or more methods based on the available data and specific workflow configurations. In one embodiment, the structured micro block may be statically defined as part of a workflow configuration. The structured micro block may be dynamically generated based on a state of a workflow. The structured micro block may be generated based on detected intent, or entities extracted from a text conversation in a form of the unstructured natural language.

A code for generating the structured micro block for checking balance is shown below. For example, in the below code, type information related to labels such as amount, Enum, 9 digit Number, and Email are stored as pattern attributes that makes the structured micro block as a strongly typed structured micro block. The pattern attributes type checks each type information in the structured micro block.

The data type configuring module 204 configures the data type that constitutes the strongly typed structured micro block. The structured micro block incorporating module 206 incorporates the structured micro block that collects strongly typed information from the user 102 as the part of the conversation in the messaging channel. The structured workflow generating module 208 generates the structured workflow by interleaving the structured micro block with the unstructured natural language. The structured workflow communicating module 210 communicates the structured workflow over the messaging channel for enabling the user 102 to perform the one or more operations.

Figure 3:
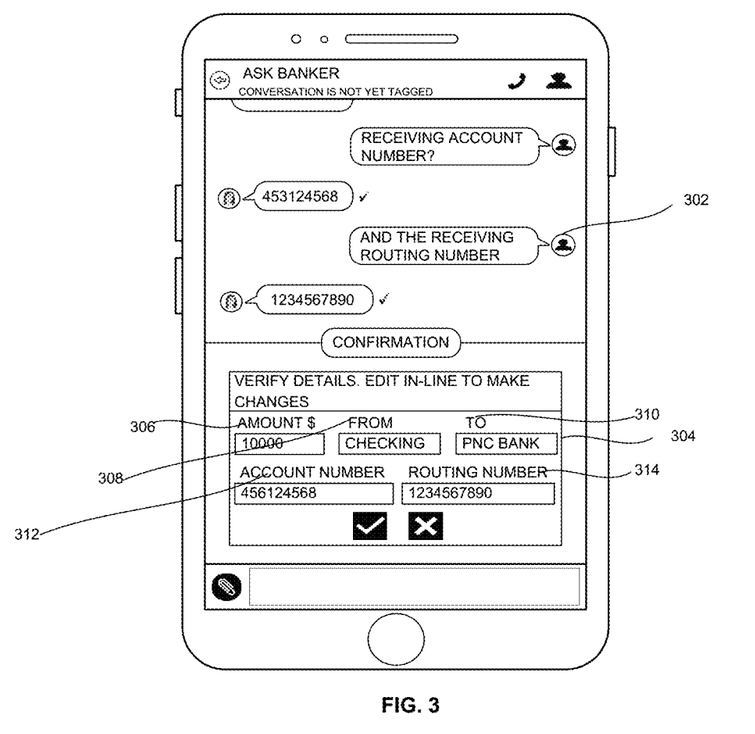
FIG. 3 illustrates a user interface view of a user device of FIG. 1 that depicts unstructured elements and a structured micro block according to an embodiment herein.

With reference to FIG. 2, FIG. 3 illustrates a user interface view of the user device 104 of FIG. 1 that depicts unstructured elements and a structured micro block 304 according to an embodiment herein. The user interface view depicts the structured micro block 304 that is communicated over the messaging channel for enabling the user 102 to transfer funds using the user device 104. In one embodiment, the user 102 may request the server 108 for transferring the funds from his or her account to a second user through the user device 104. In one embodiment, the server 108 may provide options to the user 102 to reject a conversation with the agent 112 (when the user 102 touch an icon in the conversation). The server 108 obtains the request from the user 102 through the user device 104. The server 108 obtains details for the request in a form of unstructured natural language 302 (e.g. an account number and a routing number) from the conversation in the messaging channel between the user 102 and the agent 112. The server 108 includes the structured micro block generating module 202 that presents the structured micro block 304 (e.g. for fund transfer) based on the conversation in the messaging channel between the user 102 and the agent 112. In one embodiment, the server 108 includes the structured workflow generating module 208 that generates the structured workflow (e.g. for fund transfer) by interleaving the structured micro block 304 with the unstructured natural language 302 (e.g. the account number and the routing number) that is obtained from the conversation in the messaging channel. The server 108 communicates the structured micro block 304 over the messaging channel for enabling the user 102 to transfer the funds from his or her account to the second user. In one embodiment, the structured micro block 304 is communicated to the user device 104 and displayed on the user device 104. In one embodiment, the structured micro block 304 may enable the user 102 to (i) verify or check details in the structured micro block 304 and (ii) edit the details in the structured micro block 304 such as amount 306, from 308 (amount to be debited), to 310 (amount to be credited), the account number 312 (i.e. provided by the user 102) and the routing number 314 (i.e. provided by the user 102) in the structured micro block 304. The structured micro block 304 further enables the user 102 to (i) accept the structured micro block 304 when the details in the structured micro block 304 are matched with the details in the unstructured natural language 302 that is provided by the user 102 or (ii) reject the structured micro block 304 when the details in the structured micro block 304 are not matched with the details in the unstructured natural language 302. As shown in FIG. 3, the structured micro block 304 includes a set of data elements like the Amount 306, From 308, To 310, the account number 312, and the routing number 314 and visual representations of the set of data elements. As shown in FIG. 3, the structured micro block 304 is incorporated as the part of the conversation within the messaging channel.

Figure 4A:
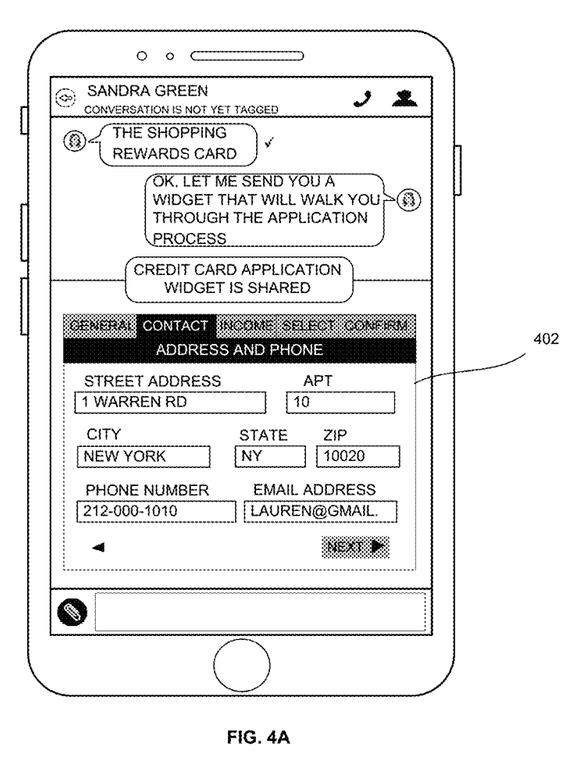
FIG. 4A illustrates a user interface view of a second user device that depicts communication of a structured micro block over a messaging channel according to an embodiment herein.

With reference to FIG. 1 and FIG. 2, FIG. 4A illustrates a user interface view of a second user device that depicts communication of a structured micro block over a messaging channel according to an embodiment herein. In one embodiment, a second user may request the server 108 for applying a credit card or a shopping card through the second user device. The structured micro block generating module 202 of the server 108 obtains a request from the second user device of the second user and communicates the request to the agent device 110. In one embodiment, the agent 112 sends a reply to the second user (e.g. Let me send you a structured micro block that will walk you through an application process), using the agent device 110. The structured micro block generating module 202 may identify or design the structured micro block that may include a credit card application 402 based on the request from the second user and communicates the structured micro block to the second user through the second user device. The credit card application 402 includes a general tab, a contact tab, an income tab, a select tab, and a confirm tab. As shown in the FIG. 4A, the structured micro block includes a title like the credit card application. As shown in the FIG. 4A, unstructured natural language such as "SHOPPING REWARDS CARD" may be analysed to extract and store entities in a form of a metadata. In some embodiments, the metadata for the entities may also include the data entered into the structured micro block such as an account number, an address, a date, and other identifiable classes of information. In some embodiments, the metadata like the extracted entities enable the user to recreate a context in which the structured micro block is used. In one embodiment, the general tab include general information such as a first name, a last name, a social security number, and a date of birth of the second user. In one embodiment, the contact tab include contact information such as a street, a city, a state, a zip code, a phone number, and an email address of the second user.

Figure 4B:
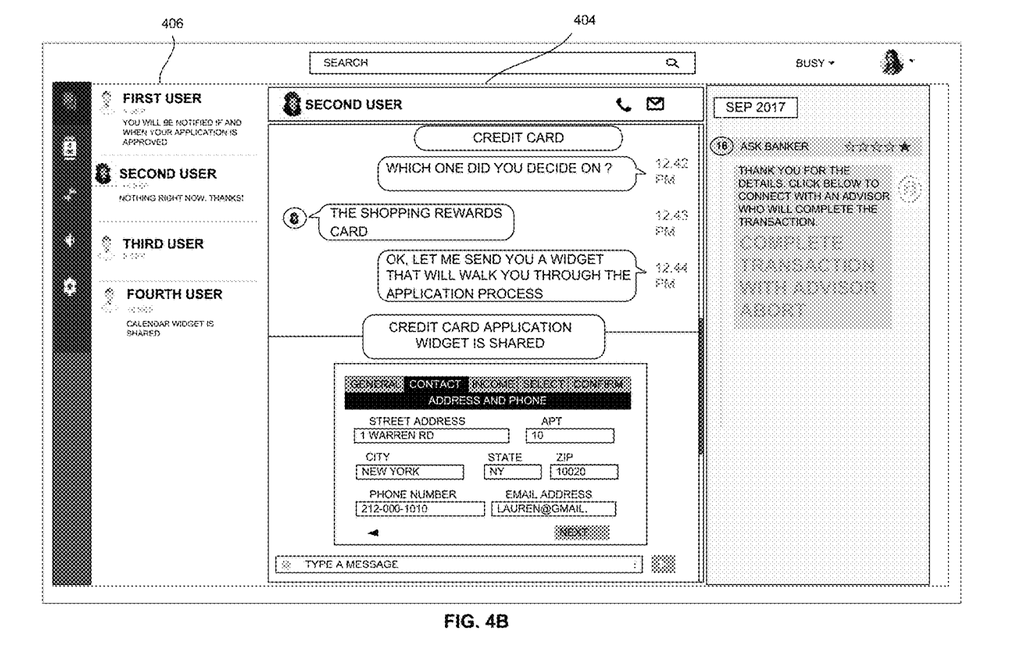
FIG. 4B illustrates a user interface view of an agent device of FIG. 1 that depicts communication of a structured micro block over the messaging channel according to an embodiment herein.

With reference to FIG. 4A, FIG. 4B illustrates a user interface view of the agent device 110 of FIG. 1 that depicts communication of the structured micro block over the messaging channel according to an embodiment herein. The user interface view depicts a chat field 404 and a user field 406 that shows one or more users in the messaging channel with their current status. In one embodiment, the user field 406 may include a current status of the one or more users who are communicating to the agent 112 over the messaging channel (e.g. a calendar structured micro block is shared with a fourth user). The chat field 404 may include the user who is currently communicating over the messaging channel (e.g. the credit card application 402 that is shared with the second user). In one embodiment, the agent 112 sends a reply through a reply field (e.g. Thank You for the details and complete the transaction with an advisor). In one embodiment, structured micro block state changes carried over across the one or more users. In one embodiment, policy rules for each data block determine a user who can see the data. In one embodiment, structured micro block HTML and the structured micro block state are stored as separate but linked messages in a database (e.g. database 200). In some embodiments, the structured micro block state includes the structured micro block along with the data entered into the structured micro block.

Figure 5:
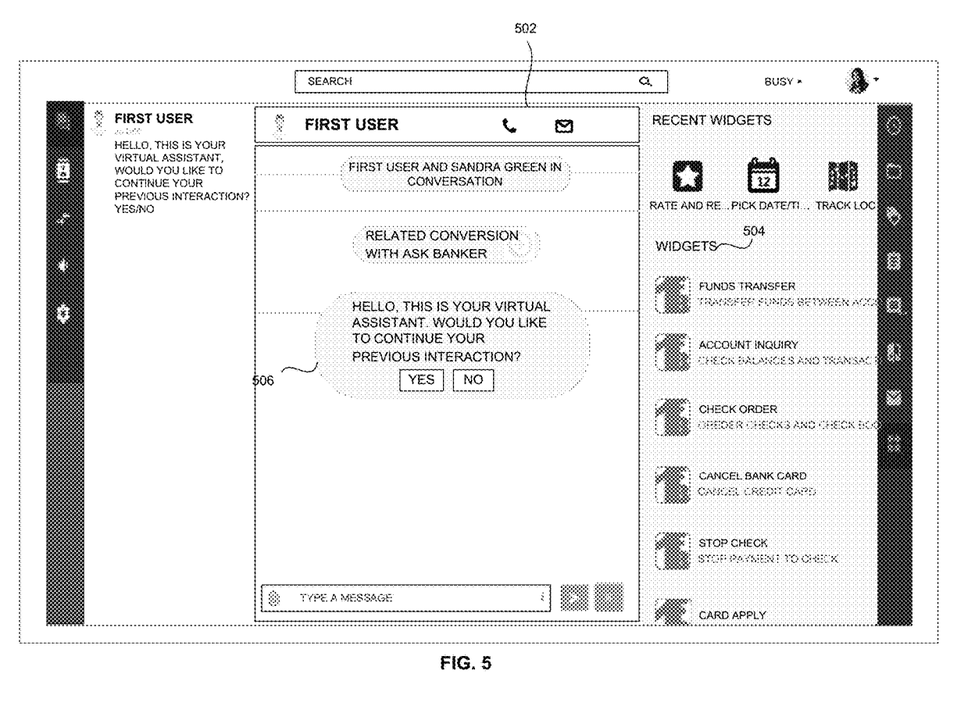
FIG. 5 illustrates a user interface view of a dynamic contextual structured micro block of an agent device of FIG. 1 according to an embodiment herein.

FIG. 5 illustrates a user interface view of a dynamic contextual structured micro block of the agent device 110 of FIG. 1 according to an embodiment herein. The user interface view depicts a conversation between the user (e.g. the user 102) and a virtual assistant 502 and one or more structured micro blocks 504. The conversation between the user (e.g. the user 102) and the virtual assistant 502 may provide options 506 to the user (e.g. the user 102) to accept or reject a previous interaction done by the user (e.g. the user 102) to continue the conversation with the virtual assistant 502. In some embodiments, the one or more structured micro blocks 504 may be pre-existing structured micro blocks such as (i) a funds transfer structured micro block, (ii) an account inquiry structured micro block, (iii) a check order structured micro block, (iv) a cancel bank card structured micro block, (v) a stop check structured micro block or (vi) a card apply structured micro block. In one embodiment, the one or more structured micro blocks 504 may be automatically determined by the server 108 and displayed on the agent device 110 based on a context of the conversation between the user 102 and the agent 112.

Figure 6:
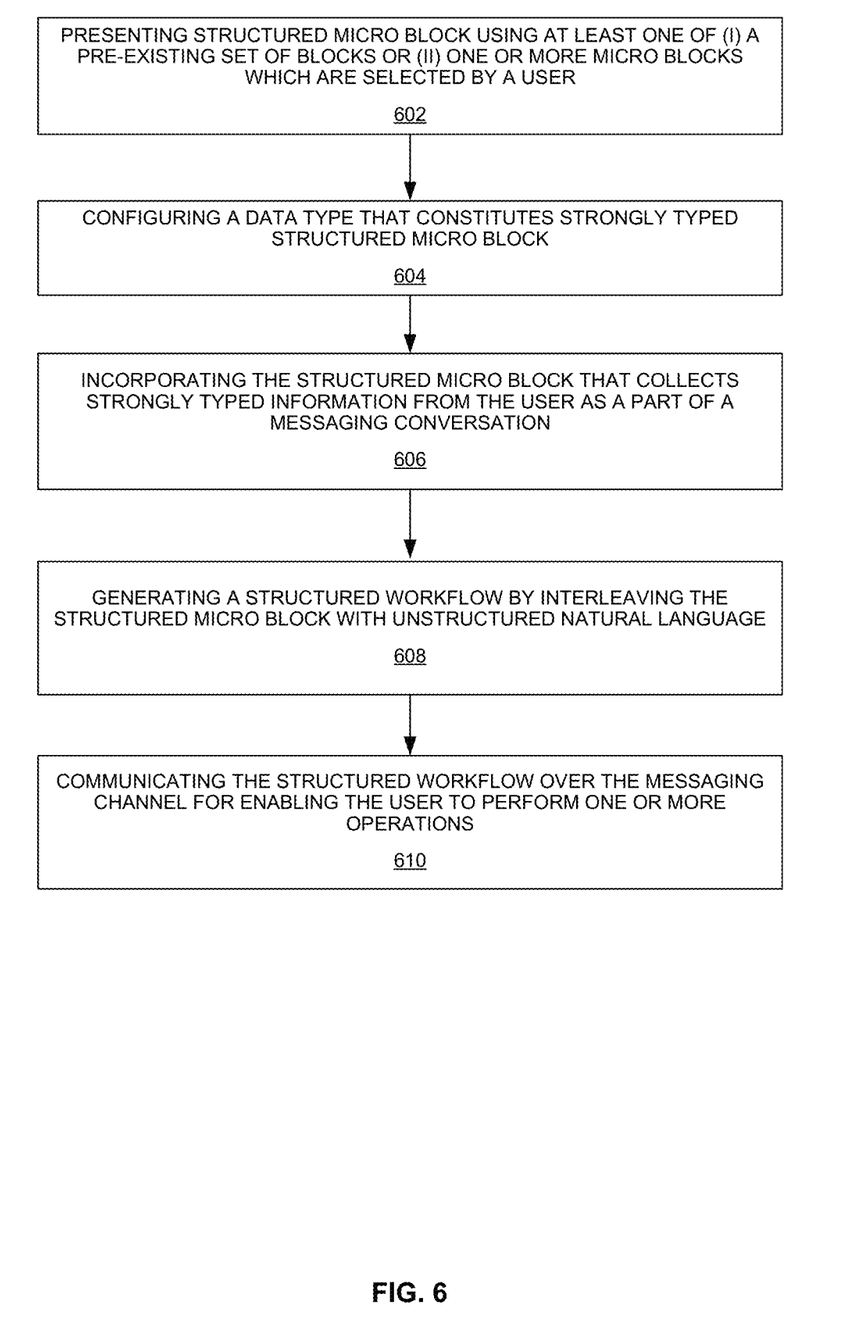
FIG. 6 is a flow diagram that illustrates a method for generating and communicating communication components over a messaging channel according to an embodiment herein.

FIG. 6, with reference to FIG. 1, is a flow diagram that illustrates a method for generating and communicating communication components over a messaging channel according to an embodiment herein. At step 602, the structured micro block is presented using at least one of (i) the pre-existing set of structured micro blocks or (ii) the one or more structured micro blocks which are selected by the user 102. At step 604, the data type that constitutes the strongly typed structured micro block is configured. At step 606, the structured micro block that collects strongly typed information from the user 102 is incorporated as the part of the conversation in the messaging channel. At step 608, the structured workflow is generated by interleaving the structured micro block with the unstructured natural language. At step 610, the structured workflow is communicated over the messaging channel for enabling the user 102 to perform the one or more operations.

```
<div name="form validate" class="column gap">
    <div class="column" style="max-width: 44ch;">
        <div class="row left header ellipsis">
            Please enter valid data below.
        </div>
        <div class="form-table body">
            <div class="form-item">
                <label>Amount</label>
<input name="amount" type="text" placeholder="100.00"
        required="true" pattern="\d+(\.\d\d)?" />
            </div>
            <div class="form-item">
                <label>Enum</label>
                <input name="from" type="text"
placeholder="Checking" pattern="Checking|Savings"
style="width: 9ch;"/>
            </div>
            <div class="form-item">
                <label>9 digit Number</label>
    <input name="to" type="text" placeholder="1234-56789"
        pattern="\d{4,4}-\d{5,5}" style="width: 13ch;"/>
            </div>
            <div class="form-item">
                <label>Email</label>
    <input name="email" type="email" placeholder="user@domain"
        required="true" style="width: 13ch;"/>
            </div>
        </div>
        <div class="row center stretch gap if-active">
            <button class="button submit"
    onclick="validate('amount','from','to','email'); close( );
        save('data','html')">Submit</button>
        </div>
    </div>
```

The embodiments herein may comprise a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet cards are just a few of the currently available types of network adapters.

Figure 7:
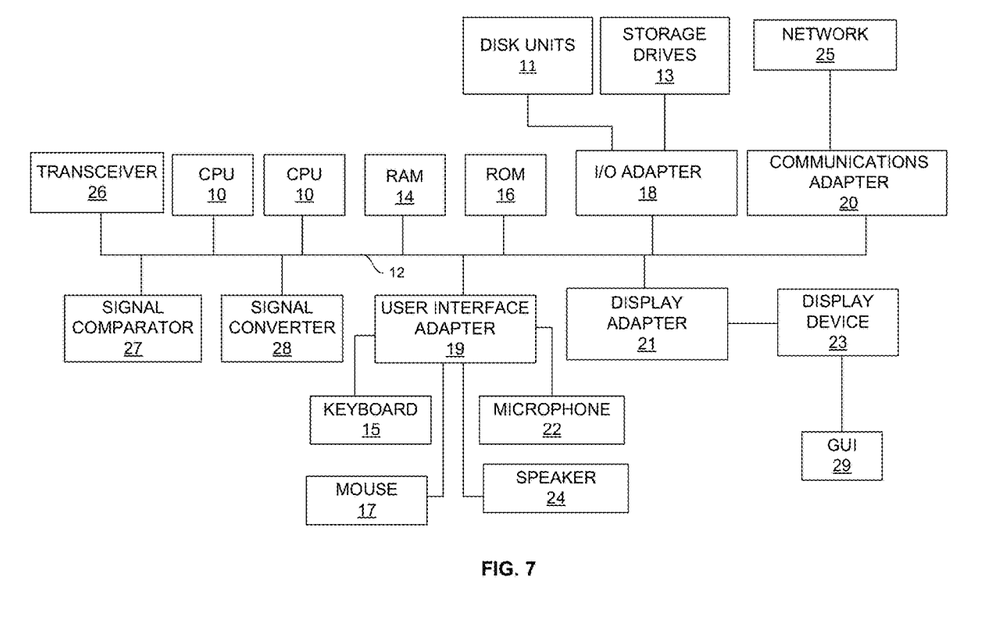
FIG. 7 is a server used in accordance with the embodiments herein.

A representative hardware environment for practicing the embodiments herein is depicted in FIG. 7, with reference to FIGS. 1 through 6. This schematic drawing illustrates a hardware configuration of a server/computer system/computing device 108 in accordance with the embodiments herein. The server 108 comprises at least one processing device 10. The special-purpose CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The server 108 can read the inventive instructions on the program storage devices and follow these instructions to execute the methodology of the embodiments herein.

The server 108 further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for generating and communicating communication components over a messaging channel, said method comprising:

incorporating a structured micro block that collects strongly typed information from a user as a part of a conversation in said messaging channel, wherein said structured micro block is presented based on said conversation in a form of unstructured natural language between the user and an agent for incorporating said structured micro block as said part of said conversation in said messaging channel, wherein said structured micro block comprises a set of data elements and visual representations of said set of data elements, wherein said structured micro block is strongly typed;

generating a structured workflow by interleaving said structured micro block with said unstructured natural language; and communicating said structured workflow over said messaging channel for enabling said user to perform one or more operations, wherein a previous state of a conversation history is presented at a later time in said messaging channel based on (a) a Uniform Resource Locator (URL) of said structured micro block, and (b) data corresponding to said structured micro block, wherein a database that stores one or more structured micro blocks along with data entered into said one or more structured micro blocks and retrieves said one or more structured micro blocks along with said data entered into said one or more structured micro blocks to present to said user at said later time.

2. The method of claim 1, wherein the method further comprises analyzing said unstructured natural language for extracting entities along with content and an intent to add type information in said unstructured natural language.

3. The method of claim 1, wherein said structured micro block is expressed in a Hypertext Markup Language (HTML) with type information that is stored as pattern attributes in said HTML.

4. The method of claim 1, wherein said data is provided to said structured micro block by said user by entering said data into a user interface element of said structured micro block.

5. The method of claim 1, wherein the method further comprises (a) sending said a Uniform Resource Locator (URL) of said structured micro block and (b) sending said data corresponding to said structured micro block in a separate message on said messaging channel for presenting said previous state of said conversation history at said later time in said messaging channel.

6. The method of claim 1, wherein the method further comprises validating said data entered at said structured micro block based on user-specific business logic.

7. The method of claim 1, wherein said structured micro block is prefilled with data when said structured micro block is presented to said user or said agent based on at least one of (a) context of a recent conversation, (b) previous user history, (c) predicted conversation, (d) a specific point in time or (e) point in time relative to a specific time or an event.

8. The method of claim 1, wherein said data is derived from at least one of static data from design time, collected or changed data at runtime and persistent dynamic data changes over time at runtime.

9. One or more non-transitory computer readable storage mediums storing one or more sequences of instructions, which when executed by one or more processors, causes a processor implemented method for generating and communicating communication components over a messaging channel by performing the steps of:
  incorporating a structured micro block that collects strongly typed information from a user as a part of a conversation in said messaging channel, wherein said structured micro block is presented based on said conversation in a form of unstructured natural language between said user and an agent for incorporating said structured micro block as said part of said conversation in said messaging channel, wherein said structured micro block comprises a set of data elements and visual representations of said set of data elements, wherein said structured micro block is strongly typed;
  generating a structured workflow by interleaving said structured micro block with said unstructured natural language; and
  communicating said structured workflow over said messaging channel for enabling said user to perform one or more operations, wherein a previous state of a conversation history is presented at a later time in said messaging channel based on (a) a Uniform Resource Locator (URL) of said structured micro block, and (b) data corresponding to said structured micro block, wherein a database that stores one or more structured micro blocks along with data entered into said one or more structured micro blocks and retrieves said one or more structured micro blocks along with said data entered into said one or more structured micro blocks to present to said user at said later time.

10. The one or more non-transitory computer readable storage mediums storing the one or more sequences of instructions of claim 9, which when executed by one or more processors, further causes analysis of said unstructured natural language for extracting entities along with content and an intent to add type information in said unstructured natural language.

11. The one or more non-transitory computer readable storage mediums storing the one or more sequences of instructions of claim 9, wherein said data is provided to said structured micro block by said user by entering said data into a user interface element of said structured micro block.

12. The one or more non-transitory computer readable storage mediums storing the one or more sequences of instructions of claim 9, further causes (a) sending said Uniform Resource Locator (URL) of said structured micro block and (b) sending said data corresponding to said structured micro block in a separate message on said messaging channel for presenting said previous state of said conversation history at said later time in said messaging channel.

13. A system for generating and communicating communication components over a messaging channel, said system comprising:
  a memory that stores a set of instructions; and
  a processor that executes the set of instructions and is configured to:
    incorporate a structured micro block that collects strongly typed information from a user as a part of a conversation in said messaging channel, wherein said structured micro block is presented based on said conversation in a form of unstructured natural language between said user and an agent for incorporating said structured micro block as said part of said conversation, wherein said structured micro block comprises a set of data elements and visual representations of said set of data elements, wherein said structured micro block is strongly typed;
    generate a structured workflow by interleaving said structured micro block with unstructured natural language; and
    communicate said structured workflow over said messaging channel for enabling said user to perform one or more operations, wherein a previous state of a conversation history is presented at a later time in said messaging channel based on (a) a Uniform Resource Locator (URL) of said structured micro block, and (b) data corresponding to said structured micro block, wherein a database that stores one or more structured micro blocks along with data entered into said one or more structured micro blocks and retrieves said one or more structured micro blocks along with said data entered into said one or more structured micro blocks to present to said user at said later time.

14. The system of claim 13, wherein said processor is further configured to analyze said unstructured natural language for extracting entities along with a content and an intent to add type information in said unstructured natural language.

* * * * *